Patented Apr. 7, 1953

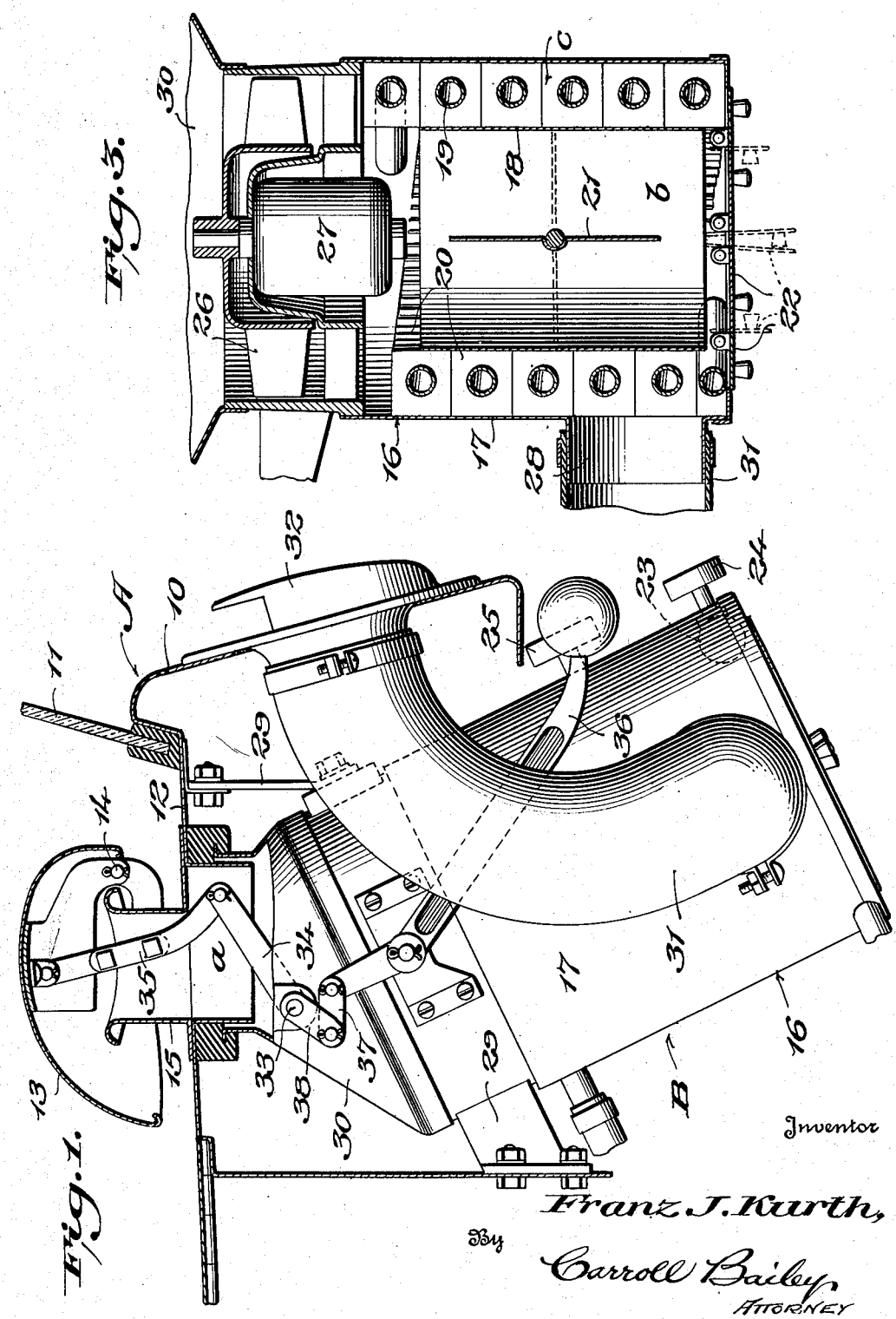

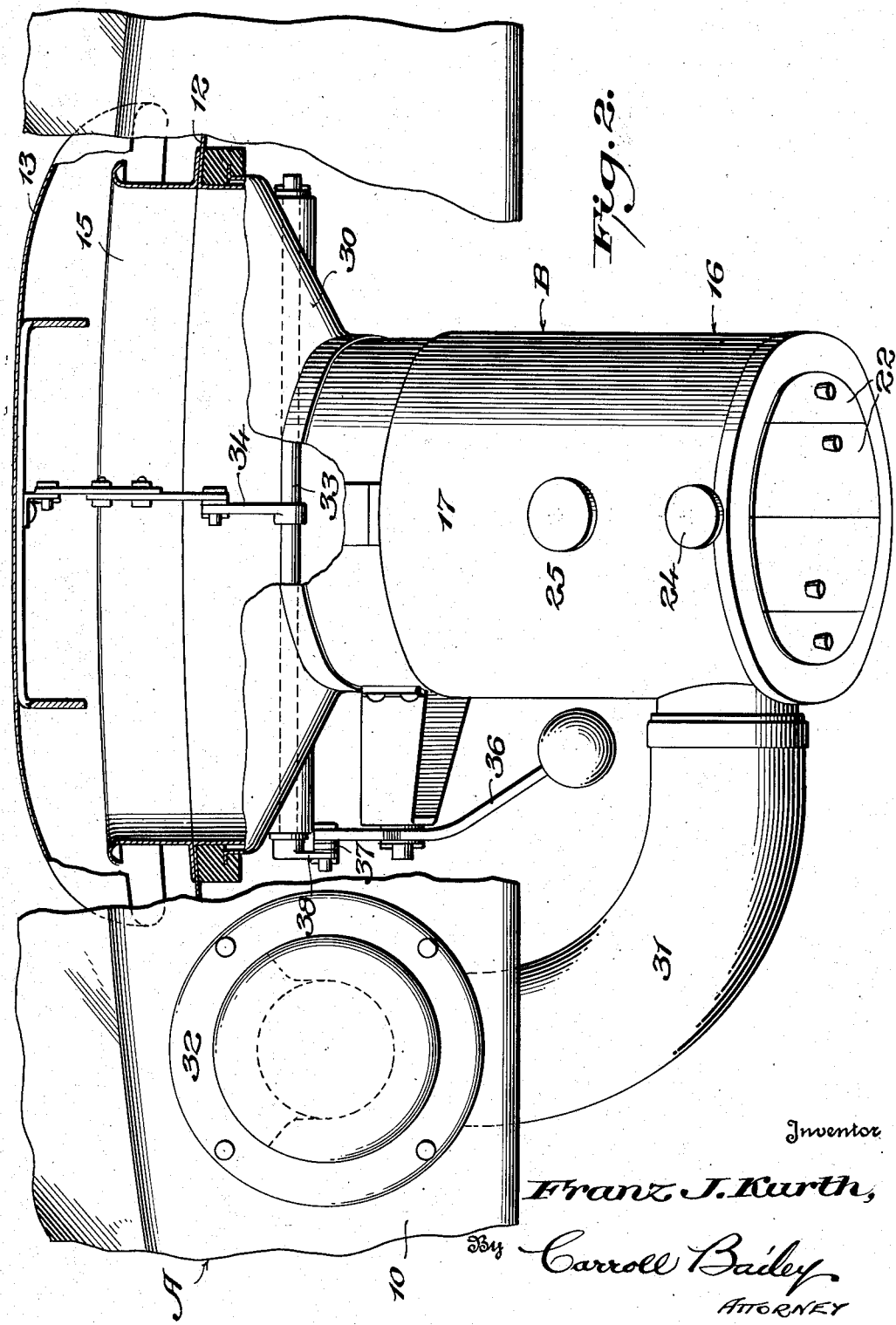

2,634,107

UNITED STATES PATENT OFFICE 2,634,107

VENTILATING APPARATUS WITH HEAT EXCHANGER

Franz J. Kurth, Mamaroneck, N. Y., assignor to Anemostat Corporation of America, New York, N. Y., a corporation of Delaware Application November 3, 1949, Serial No. 125,225

4 Claims. (Cl. 257—137)

This invention relates to apparatus for supplying air to enclosures, such as truck cabs, passenger automobiles, airplane cabins and the like, either in unheated condition for ventilating or cooling purposes, or in heated condition for heating, windshield defrosting or other purposes, and has for its general object to provide for such purposes a simple, practical, compact apparatus which may be produced economically, which is highly efficient in operation and which includes a novel air heating and by-pass unit having a novel combination and arrangement of valve elements whereby the supply of either unheated air for ventilating or cooling purposes, or of heated air for heating, windshield defrosting or other purposes, may readily be regulated.

With the foregoing and other more specific objects in view, which will become apparent as the nature of the invention is better understood, the same consists in an apparatus for the purposes stated which embodies the novel features of construction, combination and arrangement of parts as are illustrated by way of example in the accompanying drawings and as will be hereinafter more fully described and claimed.

In the accompanying drawings, wherein like characters of reference denote corresponding parts in the different views:

Fig. 1 is a fragmentary longitudinal section through a portion of a motor vehicle showing the present apparatus operatively mounted therein.

Fig. 2 is a rear elevation, partly in section, of the structure shown in Fig. 1; and Fig. 3 is a central, longitudinal section through the air heating and by-pass unit of the apparatus.

Referring to the drawings in detail, A designates, generally, a portion of a motor vehicle and B designates, generally, an apparatus constructed in accordance with one practical embodiment of the invention and operatively mounted in the vehicle A.

The vehicle A includes, as usual, an instrument panel 10, a windshield 11, a cowl 12 having therein an opening $a$ for inlet of air to the vehicle, and a cover 13 for said opening which cover is pivoted, as indicated at 14, for swinging movements either to close said opening or to more or less open the same and to deflect air downwardly therethrough. To prevent rain, snow or the like from entering the opening $a$ when the cover 13 is more or less open, the cowl 12 has rising therefrom, in surrounding relationship to said opening, a wall 15.

The apparatus B includes essentially an air heating and by-pass unit, designated generally as 16, which, in accordance with the invention, is composed primarily of a pair of open-ended tubular members 17 and 18 the latter of which is disposed within and spaced from the former. Thus, the space within the inner tubular member 18 constitutes an inner or central air passageway $b$ extending longitudinally through the unit 16, while the space between said tubular members constitutes a second or outer, annular air passageway $c$, separate and distinct from the passageway $b$, likewise extending longitudinally through said unit 16.

In the outer or annular air passageway $c$ is disposed a suitable means for heating air flowing through said passageway. In this connection and as illustrated by way of example in Fig. 3 of the drawings, said air heating means may appropriately comprise a helically wound tube 19 provided at points suitably spaced apart along its length with numerous heat radiating flanges 20. Thus, by circulating a hot fluid through the tube 19, the latter and its flanges 20 will be heated and will serve effectively to heat air flowing through the passageway $c$ over said tube and between said flanges.

To control flow of air through the inner or central passageway $b$, the tubular member 18 is provided, interiorly thereof, with suitable valve means such, for example, as a damper 21, while to regulate flow of air from the outlet ends of both of the passageways $b$ and $c$, the unit 16 is provided at its outlet end with a plurality of pivoted, manually adjustable shutters 22.

The ends of the tube 19 extend through the outer tubular member 17 for connection with a suitable source of hot fluid, while in said tube is interposed, at a suitable point, a valve 23 of any suitable type, illustrated by dotted lines in Fig. 1 of the drawings, by means of which flow of hot fluid through said tube may be controlled. Disposed exteriorly of the outer member 17 is a suitable handle 24 by means of which the valve 23 may be opened and closed. Also disposed exteriorly of the outer member 17, preferably adjacent to the handle 24, is another handle 25 by means of which the damper 21 may be opened and closed.

In the air inlet end portion of the unit 16 is suitably mounted a fan 26, preferably of the axial flow type, which includes a driving motor 27 and which, in operation, is effective to draw air into the inlet end portion of said unit and to direct it into both of the passageways $b$ and $c$.

Adjacent to the air outlet end of the unit 16, the outer tubular member 17 is provided with an air outlet opening 28.

While the apparatus B may be mounted in any suitable manner at any suitable point in the vehicle A with the unit 16 disposed in any suitable manner, said apparatus preferably is mounted by means of suitable brackets 29 beneath the cowl 12 with the unit 16 disposed at a suitable downward and rearward inclination and with its upper and lower ends constituting its air inlet and air outlet ends, respectively. In any event, the upper or air inlet end of the unit 16 is connected to the air inlet opening $a$ in the cowl 12 by a suitable duct 30 so that only outside air is supplied to said unit. Moreover, the ends of the tube 19 are connected to the water jacket of the vehicle engine (not shown) at suitable points so that the engine cooling liquid will circulate through said tube and serve to heat the same and its flanges 20 when the valve 23 is open. Furthermore, the air outlet opening 28 in the outer tubular member 17 is connected by a suitable duct 31 to a suitable nozzle 32 which is mounted on the instrument panel 10 or at any suitable point so as to direct air flowing from said nozzle over the windshield 11.

Journaled in the duct 30 is a shaft 33 on which is an arm 34 which is connected by a link 35 with the cover 13 whereby partial rotation of said shaft is effective to open or close said cover, while suitably mounted on the unit 16 is a lever 36 which is connected by a link 37 with a second arm 38 on said shaft 33 whereby swinging movement of said lever 36 is effective to rotate said shaft. Thus, by means of the lever 36, the cover 13 may be opened and closed at will to permit more or less outside air to flow through the opening $a$ to the unit 16.

If it is desired to supply outside, unheated air to the vehicle A for ventilating or cooling purposes, the valve 23 is closed to prevent hot fluid from circulating through the tube 19; the cover 13 is opened a desired amount; the damper 21 is opened; the fan 26 may or may not be operated, depending upon whether the vehicle is under way and whether, due to its advance, the desired amount of air is deflected through the unit 16 by the cover 13, and the shutters 22 are more or less opened to regulate the amount of air passing through both of the passageways $b$ and $c$ in the unit 16 into the vehicle A.

If it is desired to supply warm air to the vehicle A for heating purposes, the valve 23 is opened to permit circulation of hot fluid through the tube 19; the damper 21 is closed, to prevent flow of air through the inner passageway $b$ so that all air flowing through the unit 16 is required to pass through the passageway $c$; the fan 26 is or is not operated, depending upon whether the vehicle is under way and whether due to its advance, the desired amount of air is deflected through the unit 16 by the cover 13, and the shutters 22 are more or less opened to regulate the amount of air passing through the passageway $c$ into the vehicle. In this connection it will be observed that the lower or air outlet end of the inner tubular member 18 is spaced upwardly or inwardly from the air outlet end of the outer tubular member 17 to permit air flowing through the passageway $c$ to be discharged from the unit 16 substantially throughout the area of the outlet end thereof. The air flowing through the passageway $c$ is, of course, heated by its contact with the tube 19 and the flanges 20 and, when discharged into the vehicle A, serves, of course, to heat the latter.

If it is desired to supply heated air to the nozzle 32 to be directed by said nozzle over the windshield 11 for purposes of defrosting or deicing the latter, the damper 21 is closed to prevent flow of air through the inner passageway $b$ so that all air flowing through the unit 16 is required to pass through the passageway $c$; the valve 23 is opened to permit circulation of hot fluid through the tube 19; the fan 26 is or is not operated, depending upon whether the vehicle is under way and whether due to its advance, the desired amount of air is deflected through the unit 16 by the cover 13, and the shutters 22 are closed so that air flowing through the passageway $c$ is required to flow through the duct 31 to the nozzle 32. The air in flowing through the passageway $c$ is, of course, heated by contact with the tube 19 and the flanges 20 and is directed over the windshield 11 by the nozzle 32 whereby the windshield is defrosted or deiced.

As will be understood, the damper 21 and the shutters 22 may be adjusted not only to regulate the total amount of air flowing through the unit, but to regulate the proportions of the said total amount of air which flow through the passageways $b$ and $c$, respectively, whereby the vehicle A may be supplied with any desired amount of air at any desired temperature.

From the foregoing description considered in connection with the accompanying drawings it is believed that the construction and operation of the present apparatus will be clearly understood and that its advantages will be appreciated. It is desired to point out, however, that while only a single, specific structural embodiment of the invention has been illustrated and described, the same is readily capable of specifically different structural embodiments within its spirit and scope as defined in the appended claims.

I claim:

1. In apparatus of the character described, an air heating and by-pass unit comprising a pair of tubular members one of which is disposed within and spaced from the other and each of which is open at the rear end of the unit for inlet of air thereto and open at the front end of the unit for outlet of air therefrom, air heating means in the space between said members, a damper in the inner of said members for regulating flow of air therethrough, a pair of shutters adjacent to the front end of the inner of said members pivoted on axes extending at substantially right angles to the longitudinal axes of said members for regulating in major amount flow from said inner member of all air passing through the latter, a pair of shutters located at opposite sides, respectively, of said first mentioned shutters adjacent to the front end of the space between said members and in alinement with said space and also pivoted on axes extending at substantially right angles to the longitudinal axes of said members for regulating in major amount flow from said space of all air passing through said space, and a duct leading laterally from said space at a point rearwardly of said shutters.

2. In apparatus of the character described, an air heating and by-pass unit comprising a pair of tubular members one of which is disposed within and spaced from the other and each of which is open at one end of the unit for inlet of air thereto and open at the other end of the unit for outlet of air therefrom, air heating means in the space between said members, valve means for regulating flow of air through said inner member so as to cause desired proportions of the total amount of air delivered through said members to flow through said inner member and through the space between said members, and other valve means independent of each other at the outlet ends of said members one in major part alined with said inner member for regulating in major amount flow from said inner member of all air passing through the latter and the other in major part alined with said space for regulating in major amount flow from said space of all air passing through said space.

3. In apparatus of the character described, an air heating and by-pass unit comprising a pair of tubular members one of which is disposed within and spaced from the other and each of which is open at the rear end of the unit for inlet of air thereto and open at the front end of the unit for outlet of air therefrom, air heating means in the space between said members, valve means for regulating flow of air through said inner member so as to cause desired proportions of the total amount of air delivered through said members to flow through said inner member and through the space between said members, other valve means independent of each other at the front ends of said members one in major part alined with said inner member for regulating in major amount flow from said inner member of all air passing through the latter and the other in major part alined with said space for regulating in major amount flow from said space of all air passing through said space, and a duct leading from the space between said members at a point rearwardly of said second mentioned valve means, whereby regulation of said second mentioned valve means regulates flow of air from said space through said duct.

4. In apparatus of the character described, an air heating and by-pass unit comprising a pair of tubular members one of which is disposed within and spaced from the other and each of which is open at the rear end of the unit for inlet of air thereto and open at the front end of the unit for outlet of air therefrom; air heating means in the space between said members, a damper in said inner member for regulating flow of air through said inner member so as to cause desired proportions of the total amount of air delivered through said members to flow through said inner member and through the space between said members, other valve means independent of each other at the front ends of said members one in major part alined with said inner member for regulating in major amount flow from said inner member of all air passing through the latter and the other in major part alined with said space for regulating in major amount flow from said space of all air passing through said space, and a duct leading from the space between said members at a point rearwardly of said second mentioned valve means, whereby regulation of said second mentioned valve means regulates flow of air from said space through said duct, the front ends of said inner member and said space being in communication with each other when said valve means are closed.

FRANZ J. KURTH.

REFERENCES CITED

The following references are of record in the file of this patent:

UNITED STATES PATENTS

| Number | Name | Date |
| --- | --- | --- |
| 2,150,505 | Hunicke | Mar. 14, 1939 |
| 2,197,172 | Aufiero | Apr. 16, 1940 |

FOREIGN PATENTS

| Number | Country | Date |
| --- | --- | --- |
| 529,827 | Great Britain | Nov. 28, 1940 |